United States Patent [19]

Shinozaki et al.

[11] 4,454,719

[45] Jun. 19, 1984

[54] EXHAUST APPARATUS IN VEHICLE

[75] Inventors: Takashi Shinozaki, Tokorozawa; Masatoshi Suzuki, Urawa, both of Japan

[73] Assignee: Honda Giken Kogyo Kabushiki Kaisha, Tokyo, Japan

[21] Appl. No.: 269,983

[22] Filed: Jun. 3, 1981

[30] Foreign Application Priority Data

Jun. 24, 1980 [JP] Japan .................................. 55-84585

[51] Int. Cl.³ ............................................ F02B 37/00
[52] U.S. Cl. ..................................... 60/605; 180/219
[58] Field of Search ................. 60/280, 605; 180/219; 181/232, 236, 238, 239, 240

[56] References Cited

U.S. PATENT DOCUMENTS 1,179,075  4/1916  Collins ................................ 181/236
4,327,811  5/1982  Isaka ................................... 181/238

FOREIGN PATENT DOCUMENTS 22694   5/1935  Australia ............................. 181/240
118907  9/1979  Japan .................................... 60/605
446914  5/1936  United Kingdom ................ 181/236

OTHER PUBLICATIONS

Annand, W. J. D., *Gas Flow in the I.C.E.* 1975, pp. 106–109.

*Primary Examiner*—Douglas Hart
*Attorney, Agent, or Firm*—Armstrong, Nikaido, Marmelstein & Kubovcik

[57] ABSTRACT

An exhaust apparatus for a vehicle having an internal combustion engine mounted on a vehicle body. The engine includes a supercharger comprising an exhaust turbine coupled to an exhaust passage of the engine and a compressor is coupled to an intake passage of the engine. The exhaust apparatus comprises an exhaust passage having one end coupled to the exhaust turbine. A first muffler is coupled to the other end of the exhaust passage and a diverging member has one end coupled to the exhaust passage at a point upstream from the first muffler. A second muffler is coupled to the other end of the diverging means.

4 Claims, 3 Drawing Figures

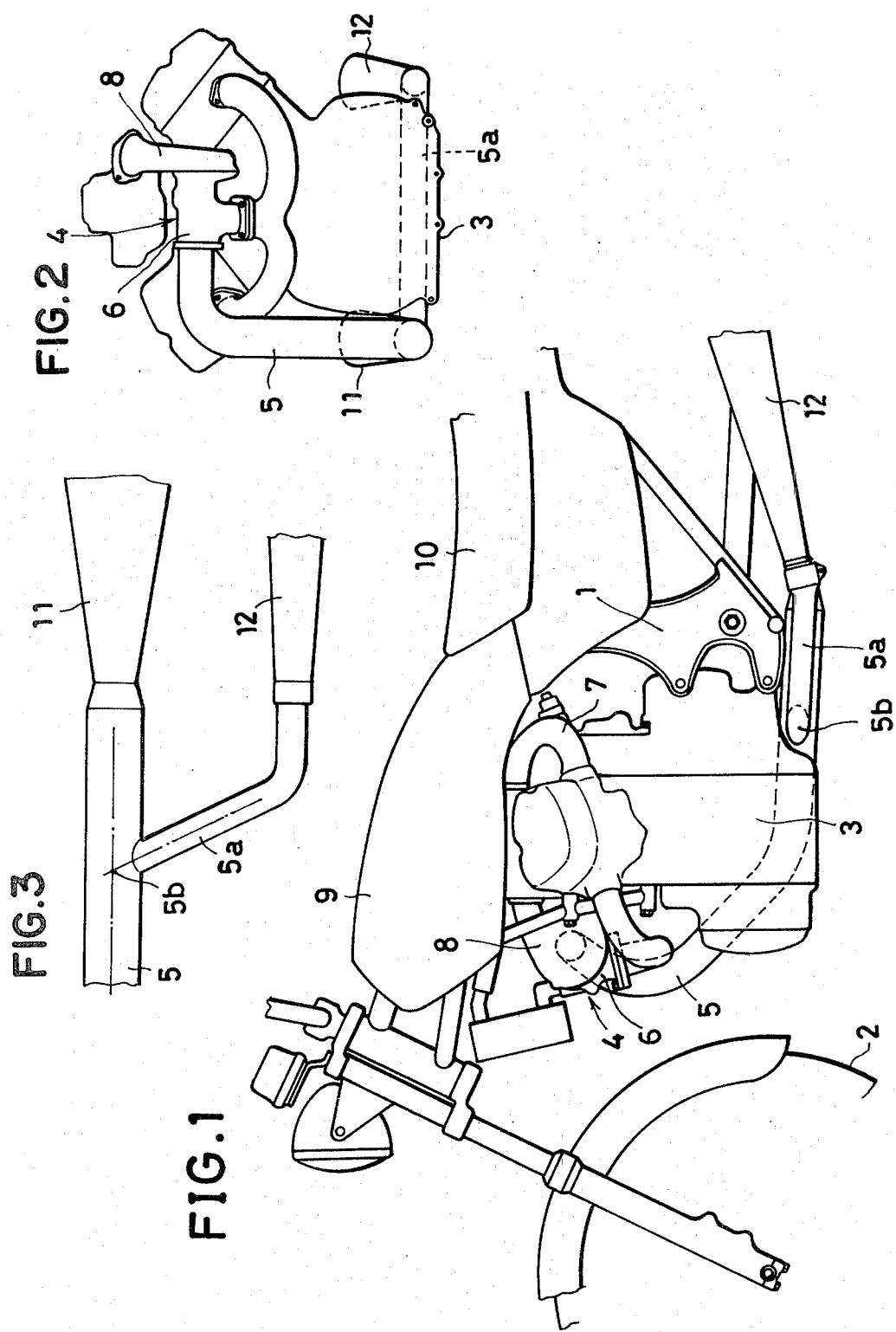

EXHAUST APPARATUS IN VEHICLE

BACKGROUND OF THE INVENTION

1. Field of the Invention

This invention relates to an exhaust apparatus chiefly used in a motorized two-wheeled vehicle of the type with an internal combustion engine having a supercharger mounted on a vehicle body.

2. Description of the Prior Art

In general, if an internal combustion engine is provided with a supercharger, it is possible to increase the amount of mixture supplied to a cylinder of the engine, and consequently the engine is increased in its power. This results in the exhaust gas thereof rising in temperature and increasing in amount. Therefore, an increase in muffler capacity is required.

SUMMARY OF THE INVENTION

It is the primary object of the present invention to provide an exhaust apparatus, for use with a supercharger, which does not increase the size of the muffler.

It is another object of the present invention to provide an exhaust apparatus with an increased sound absorption capacity.

The present invention is directed to an internal combustion engine which is mounted on a vehicle body and the engine is provided with a supercharger comprising an exhaust turbine provided in an exhaust passage of the engine and a compressor provided in an intake passage of the engine. The exhaust passage is provided on a downstream side of the exhaust turbine with a first muffler, and is provided at its portion located on an upstream side of the muffler with a diverged passage. The diverged passage is provided at its downstream side portion with a second muffler.

BRIEF DESCRIPTION OF THE DRAWINGS

FIG. 1 is a partial side view of a motorized two-wheeled vehicle having the present invention.

FIG. 2 is a front view of the apparatus of the present invention.

FIG. 3 is a top plan view of the apparatus of the present invention.

DETAILED DESCRIPTION OF THE PREFERRED EMBODIMENT

Referring to the drawings, a vehicle body 1 is provided with a front wheel 2 and a rear wheel (not shown), and is provided at its middle portion with an internal combustion engine 3 mounted thereon. The engine 3 has a supercharger 4. The supercharger 4 comprises an exhaust turbine 6 provided in an exhaust passage 5 of the engine 3 and a compressor 8 provided in an intake passage 7 of the engine 3. A fuel tank 9 is provided above the engine 3, and a driver's seat 10 is provided in the rear. The exhaust passage 5 extends at its downstream side portion rearwardly along the vehicle body 1.

According to the present invention, the exhaust passage 5 is provided at its downstream side portion below the exhaust turbine 6 with a first muffler 11, and is provided at its portion on an upstream side of the muffler 11 with a diverging passage 5a. The passage 5a is provided at its downstream side portion with a second muffler 12 so that the exhaust gas from the engine 3 flows through the exhaust passage 5 and a first portion thereof flows to the first muffler 11 and a second portion thereof flows through the diverged passage 5a to the second muffler 12.

In the preferred embodiment of the motorized two-wheeled vehicle, the first muffler 11 and the second muffler 12 are disposed on one side and on the other side, respectively, of the vehicle body 1. In this case, a diverging point 5b of the diverging passage 5a is positioned below the engine 3 and is located below and on one side of the vehicle body 1. The diverging passage 5a extends, across the lower side portion of the vehicle body 1, from the one side to the other side of the vehicle body 1 where it is connected to the second muffler 12 positioned on said other side.

As shown in FIG. 3, the diverging passage 5a extends rearwards obliquely in relation to the exhaust passage 5.

Further, it is desirable, although not necessary, that the first muffler 11 and the second muffler 12 are constructed to have mutually different characteristics so as to silence different sound ranges, and thus the overall sound range to be silenced can be widened.

Thus, according to the present invention, the exhaust apparatus is provided with a first muffler and a diverging portion coupled to a second muffler, so that these mufflers can effectively cope with the rise in exhaust temperature and the increase in the quantity of exhaust gas when the engine is provided with the supercharger. The surface temperature of the mufflers may be lowered, and the life of use thereof can be prolonged as compared with prior art systems where a single muffler is used. Additionally, there can be avoided such an ill-figure or appearance that is liable to be involved where the single muffler is enlarged in size.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust apparatus for a vehicle having an internal combustion engine mounted on a vehicle body, wherein plural cylinders are arranged laterally with respect to the driving direction of the vehicle and on both sides of the engine center line, said engine including an exhaust turbine coupled to an exhaust passage of said engine and a compressor coupled to an intake passage of said engine, said exhaust apparatus comprising first exhaust passage means including a single pipe having one end coupled to an outlet opening of said exhaust turbine, a first muffler coupled to the other end of said pipe, the pipe and the first muffler being coupled together at a position near a rear portion of the engine, diverging exhaust passage means having one end coupled to said first exhaust passage means at a point which is below a rear portion of the engine and is near the foregoing coupling between the pipe and said first muffler, and a second muffler coupled to the other end of said diverging exhaust passage means, said pipe being substantially the same diameter from its coupling to the outlet opening to its coupling to the first muffler, said engine having separate exhaust pipes leading from each of the cylinders and connected together at a position just below an inlet opening of the exhaust turbine, said supercharger being located within the lateral width of the engine cylinders and extended in front of the engine along the driving direction of the vehicle.

2. An exhaust apparatus as claimed in claim 1, wherein said vehicle is a two-wheeled vehicle having front and rear wheels, and said first and second mufflers are disposed on opposite sides of said vehicle body.

3. An exhaust apparatus as claimed in claim 2, wherein said diverging means is coupled to said exhaust passage means at a point below and on one side of said vehicle body, and said diverging means extends across the lower side portion of said vehicle body to the other side of the vehicle body.

4. An exhaust apparatus as claimed in claim 1, wherein said diverging means extends obliquely with respect to said exhaust passage means.

* * * * *